United States Patent
Soh et al.

(10) Patent No.: US 7,566,158 B2
(45) Date of Patent: Jul. 28, 2009

(54) DISPLAY DEVICE AND BACKLIGHT UNIT FOR THE SAME

(75) Inventors: Hoe-Sup Soh, Gyeonggido (KR); Man-Hoan Lee, Seoul (KR); Sung-Keun Lee, Gyeongsangbukdo (KR)

(73) Assignee: LG Display Co., Ltd., Seoul (KR)

( * ) Notice: Subject to any disclaimer, the term of this patent is extended or adjusted under 35 U.S.C. 154(b) by 302 days.

(21) Appl. No.: 11/149,161

(22) Filed: Jun. 10, 2005

(65) Prior Publication Data

US 2006/0139956 A1   Jun. 29, 2006

(30) Foreign Application Priority Data

Dec. 24, 2004   (KR)   ................ 10-2004-0112224

(51) Int. Cl.
  *F21V 7/04* (2006.01)
(52) U.S. Cl. ............... 362/607; 362/609; 362/610; 362/618; 362/619; 362/620; 362/623; 362/624; 362/625; 362/627
(58) Field of Classification Search ......... 362/609–627, 362/600, 607
See application file for complete search history.

(56) References Cited

U.S. PATENT DOCUMENTS

| | | | | |
|---|---|---|---|---|
| 5,467,208 A * | 11/1995 | Kokawa et al. | ................ | 349/67 |
| 6,196,692 B1 * | 3/2001 | Umemoto et al. | ........... | 362/606 |
| 6,356,389 B1 * | 3/2002 | Nilsen et al. | ................ | 359/625 |
| 6,439,731 B1 * | 8/2002 | Johnson et al. | ............... | 362/29 |
| 6,773,121 B2 * | 8/2004 | Miyatake et al. | ............ | 428/143 |
| 2003/0096102 A1 * | 5/2003 | Yoshihara et al. | ........... | 428/330 |
| 2004/0080926 A1 * | 4/2004 | Chen et al. | .................... | 362/31 |
| 2006/0269724 A1 * | 11/2006 | Ohashi et al. | ............... | 428/143 |

FOREIGN PATENT DOCUMENTS

| | | |
|---|---|---|
| JP | 8-106010 | 4/1996 |
| JP | 09-133812 | 5/1997 |
| JP | 2000-48617 | 2/2000 |
| JP | 2001-312213 | 11/2001 |
| JP | 2002-190204 | 7/2002 |
| JP | 2004-87234 | 3/2004 |
| JP | 2004-2-4173 | 7/2004 |
| JP | 2004-272198 | 9/2004 |
| JP | 2004-300210 | 10/2004 |
| JP | 2004-354892 | 12/2004 |

* cited by examiner

*Primary Examiner*—Sandra L O'Shea
*Assistant Examiner*—Jessica L McMillan
(74) *Attorney, Agent, or Firm*—Morgan Lewis & Bockius LLP

(57) ABSTRACT

A backlight unit for a display device is disclosed. The backlight unit includes a first optical sheet, a light source to supply light to the first optical sheet, and a first antireflection layer on a surface of the first optical sheet.

28 Claims, 7 Drawing Sheets

DISPLAY DEVICE AND BACKLIGHT UNIT FOR THE SAME

The present invention claims the benefit of Korean Patent Application No. 2004-0112224, filed in Korea on Dec. 24, 2004, which is hereby incorporated by reference.

BACKGROUND OF THE INVENTION

1. Field of the Invention

The present invention relates to a display device, and more particularly, to a backlight unit for a display device.

2. Discussion of the Related Art

Until recently, display devices have typically used cathode-ray tubes (CRTs). Presently, much effort has been made to study and develop various types of flat panel displays, such as liquid crystal display (LCD) devices, plasma display panels (PDPs), field emission displays, and electro-luminescence displays (ELDs), as a substitute for CRTs. Of these flat panel displays, LCD devices have many advantages, such as high resolution, light weight, thin profile, compact size, and low power supply requirements.

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field into direction of the induced electric field, thereby changing the light transmissivity of the LCD device. Thus, the LCD device displays images by varying the intensity of the induced electric field. Contrary to other types of display devices, the LCD devices are non-luminous display devices in that they cannot display images without some light source (e.g., ambient light or a backlight).

FIG. 1 is a cross-sectional view of an LCD device including a backlight unit according to the related art. As shown in FIG. 1, an LCD device 10 includes a liquid crystal panel LP and a backlight unit BL.

The liquid crystal panel LP includes first and second substrates 22 and 5 facing each other, and a liquid crystal layer 14. On the first substrate 22, a thin film transistor T in a switching region S, a pixel electrode 17 in a pixel region P, and a storage capacitor Cst in a storage region C are disposed. Further, gate and data lines 13 and 15 defining the pixel region P are disposed on the first substrate 22. The thin film transistor T includes a gate electrode 32, a semiconductor pattern 34, and source and drain electrodes 36 and 38. The storage capacitor Cst includes a portion of the gate line 13 as a first electrode and a metal pattern 30 as a second electrode. A gate insulator GI covers the gate line 13 and the gate electrode 32. On the second substrate 5, a plurality of color filters 7a, 7b and 7c corresponding to the respective pixel regions P, a black matrix 6 between adjacent color filters 7a, 7b and 7c, and a common electrode 18 are disposed.

The backlight unit BL is disposed below the liquid crystal panel LP such that a light emitted from the backlight unit BL is incident toward the liquid crystal panel LP. The emitted light passes through the liquid crystal panel LP and a light transmissivity of the liquid crystal layer 14 changes in accordance with the induced electric field between the pixel and common electrodes 17 and 18, and thus images are displayed.

The backlight unit BL is divided into an edge type backlight unit and a direct type backlight unit. While a light source in the edge type backlight unit is disposed at side portions of the liquid crystal panel LP, a light source in the direct type backlight unit is disposed behind the liquid crystal panel LP.

FIG. 2 is a view of an edge type backlight unit of an LCD device according to the related art. As shown in FIG. 2, an edge type backlight unit includes a lamp 52, a lamp guide 54, a light guide panel 56, a reflector 58, and a plurality of optical sheets 60.

The lamp guide 54 is disposed at one side portion of the lamp 52, and thus protects and guides the lamp 52 radiating light. The light guide panel 56 uniforms the radiated light throughout the surface thereof such that the backlight unit BL supplies uniform light to the liquid crystal panel LP (in FIG. 1). The reflector 58 is disposed below the bottom surface of the light guide panel 56 and, thus, reflects the portion of the light from the light guide panel 56 directed downward back toward the light guide panel 56 and the liquid crystal panel LP.

The optical sheets 60 are disposed on a top surface of the light guide panel 56, and include a diffusion sheet 61, first and second prism sheets 62a and 63b, and a protection sheet 63. The diffusion sheet 61 diffuses the light emitted from the light guide panel 56, thereby making it even more uniform. The first and second prism sheets 62a and 63b have surface patterns, where rising and falling portions alternate. The rising and falling portions of the first prism sheet 62a are perpendicular to those of the second prism sheet 63b. The first and second prism sheets 62a and 63b refract and concentrate the light emitted from the diffusion sheet 61 to raise a luminance thereof. The protection sheet 63 protects the prism sheets 62a and 63b, and removes light interference by the first and second prism sheets 62a and 62b.

Through the components shown in FIG. 2 and explained above, the backlight unit BL generates the light incident on the liquid crystal panel LP (in FIG. 1). To display images having a high luminance, it is necessary that the backlight unit BL generate a high luminance light. However, in the related art backlight unit, a substantial amount of light irradiated from the lamp 52 is lost.

FIG. 3 is a view illustrating a light transmissivity of a backlight unit according to the related art. As shown in FIG. 3, if first light L1 emitted from a light guide panel 56 has about a 100% luminance, then second light L2 passing through optical sheets 60 to a liquid crystal panel LP has about a 60 to 70% luminance, and third light L3 reflected by the optical sheets 60 has about 20 to 30% luminance. Therefore, the related art backlight unit loses a substantial amount of light from the lamp, and thus a luminance of the displayed images is reduced. Furthermore, to compensate for the loss of a substantial amount of light, high power consumption or an expensive backlight unit to emit a high luminance light is required. These problems are present in all types of display devices with a backlight unit.

SUMMARY OF THE INVENTION

Accordingly, the present invention is directed to a display device and a backlight unit for a display device that substantially obviate one or more of problems due to limitations and disadvantages of the related art.

An object of the present invention is to provide a liquid crystal display device that can reduce the amount of light lost in a backlight unit.

Another object of the present invention is to provide a backlight unit that can reduce the amount of light lost therein.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a backlight unit for a display device includes a first optical sheet; a light source to supply light to the first optical sheet; and a first antireflection layer on a surface of the first optical sheet.

In another aspect, a display device includes a display panel, a first optical sheet on a bottom surface of the display panel, a light source to supply light to the first optical sheet, and a first antireflection layer on a surface of the first optical sheet.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the illustrated embodiments of the present invention, which are illustrated in the accompanying drawings.

Figure 4:
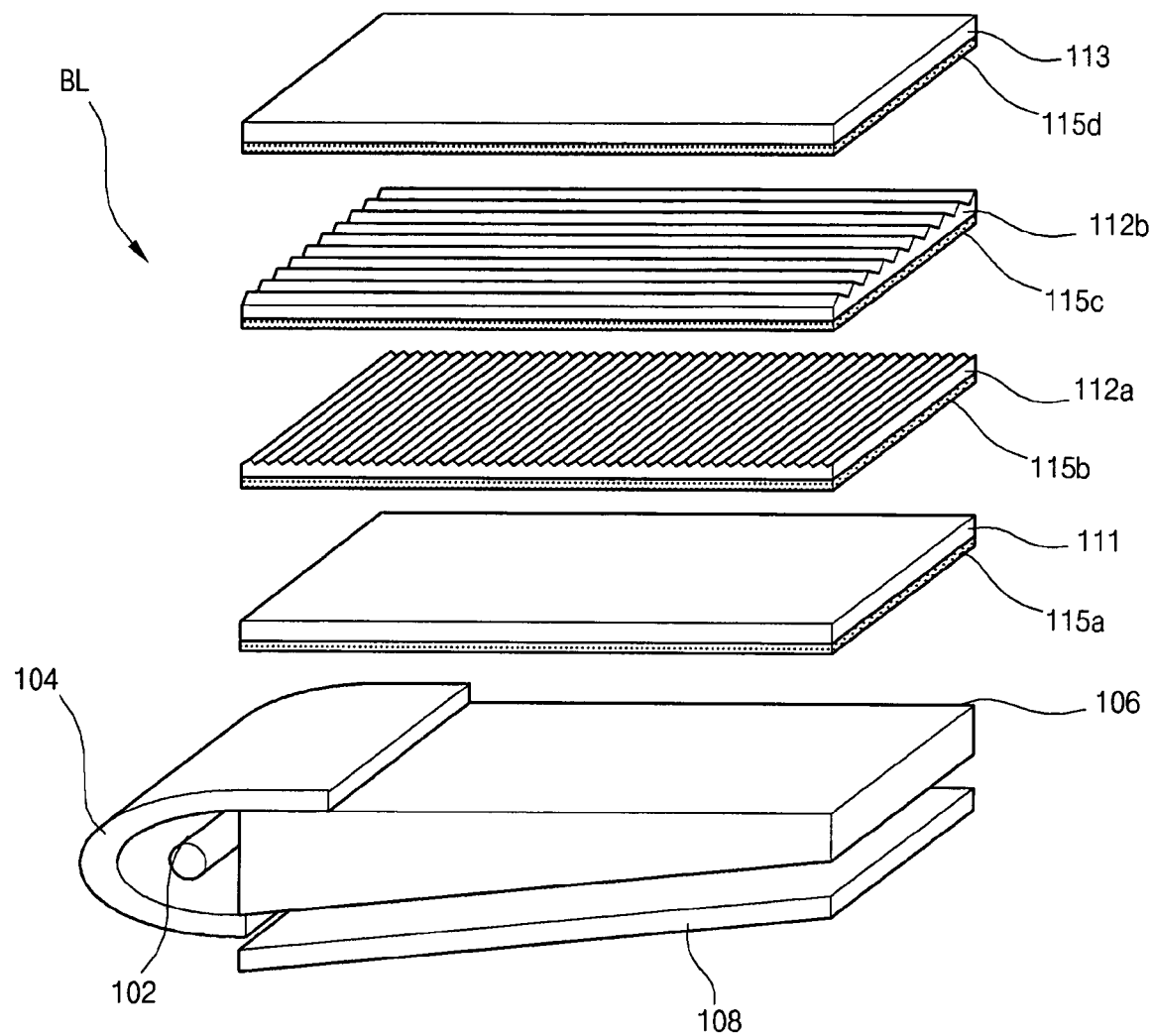
FIG. 4 is a view of an edge type backlight unit of an LCD device according to a first embodiment of the present invention.

FIG. 4 is a view of an edge type backlight unit of an LCD device according to a first embodiment of the present invention. As shown in FIG. 4, a backlight unit BL includes a lamp 102, a lamp guide 104, a light guide panel 106, a reflector 108, a plurality of optical sheets 111, 112a, 113b, and 113, and a plurality of antireflection layers 115a to 115d.

The lamp guide 104 covers one side of the light guide panel 106. The lamp 102 is disposed between the lamp guide 104 and the light guide panel 106, and is covered by the lamp guide 104. A light source such as a cold cathode fluorescent lamp (CCFL) may be used as the lamp 102. The lamp guide 104 protects and guides the lamp 102 radiating light. The light guide panel 106 uniforms the light radiated from the lamp 102 throughout the surface of the light guide panel 106 such that the backlight unit BL supplies uniform light to a liquid crystal panel (not shown). The reflector 108 is disposed below the bottom surface of the light guide panel 106 and thus reflects the portion of the light from the light guide panel 106 directed downward back toward the light guide panel 106 and the liquid crystal panel.

The optical sheets are disposed on a top surface of the light guide panel 106, and include a diffusion sheet 111, first and second prism sheets 112a and 113b, and a protection sheet 113 disposed sequentially on the top surface of the light guide panel 106. Further, on the bottom surfaces of the diffusion sheet 111, the first and second prism sheets 112a and 113b, and the protection sheet 113, first to fourth antireflection layers 115a to 115d are disposed, respectively.

The diffusion sheet 111 diffuses the light emitted from the light guide panel 106 to make the light even more uniform. The first and second prism sheets 112a and 113b have uneven surfaces, where rising and falling portions alternate. The rising and falling portions of the first prism sheet 112a may be perpendicular to those of the second prism sheet 112b. The first and second prism sheets 112a and 113b refract and concentrate the light emitted from the diffusion sheet 111 to raise a luminance thereof. The protection sheet 113 protects the prism sheets 112a and 113b, and removes light interference by the first and second prism sheets 112a and 112b.

The first to fourth antireflection layers 115a to 115d minimize reflection of the light emitted from the light guide panel 106 by the optical sheets 111, 112a, 113b, and 113. Accordingly, the first to fourth antireflection layers 115a to 115d maximize transmission of the light emitted from the light guide panel 106 through the optical sheets 111, 112a, 112b, and 113.

Figure 5:
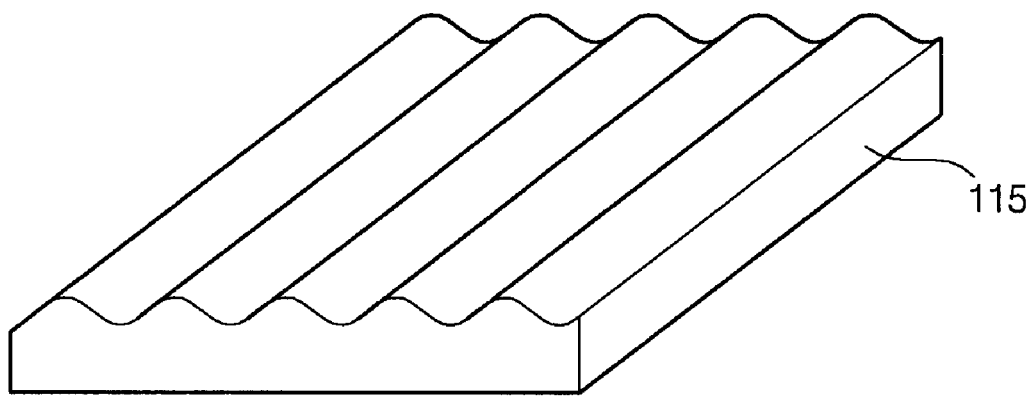
FIGS. 5 and 6 are views of antireflection layers having an uneven surface and a plurality of colloid particles, respectively, according to embodiments of the present invention.
Figure 6:
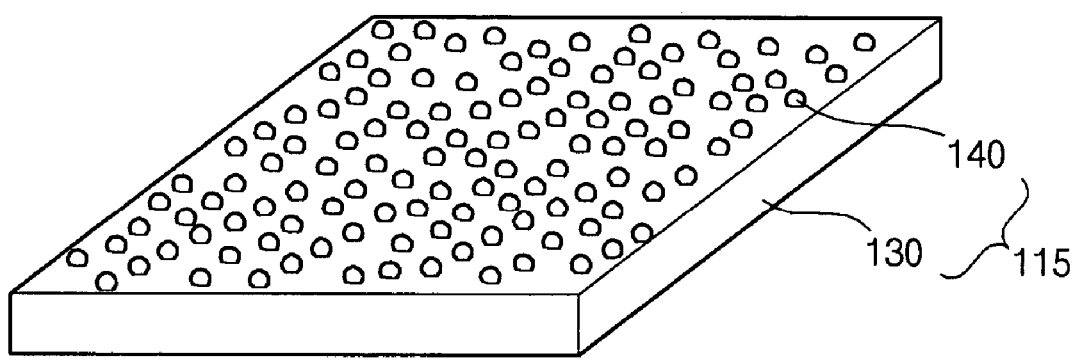

FIGS. 5 and 6 are views of antireflection layers having an uneven surface and a plurality of colloid particles, respectively, according to embodiments of the present invention.

First, as shown in FIG. 5, an antireflection layer 115 has an uneven bottom surface, such as a wave-shaped surface, that faces toward the light guide panel 106 (see FIG. 4) or a light source. The uneven surface of the antireflection layer 115 has rising and falling portions disposed alternately. The uneven surface may be formed by a method of patterning a polymer layer including AZO polymer or a similar material and then exposing the polymer layer with a laser beam. Alternatively, the uneven surface of the antireflection layer 115 may be formed by a molding method using polydimethylsiloxane (PDMS). The uneven surface of the antireflection layer 115 are formed so that the widths of the rising portion and the falling portion are equal to or less than about 100 μm, and more particularly, between about 100 nm and about 100 μm. In other words, such widths of the rising portion and the falling portion may be a width the width between adjacent peak and valley in the uneven surface The uneven surface of the antireflection layer 115 can transmit light in wide wavelength ranges, thereby allowing most of the light emitted from the light guide panel 106 (in FIG. 4) to pass through the optical sheets 111, 112a, 113b, and 113 (in FIG. 4).

Next, as shown in FIG. 6, an antireflection layer 115 has a base layer 130 and a plurality of colloid particles 140 distributed on a bottom surface on the base layer 130, which surface is to face toward the light guide panel 106 (see FIG. 4) or a light source. The colloid particles 140 can be made of polystyrene or like material. Since the colloid particles 140 have a small volume, they have a high ratio of surface area to weight. Accordingly, the colloid particles 140 are controlled mainly by surface action rather than gravity. Since the colloid particles 140 have charges on the surface thereof, the colloid particles 140 are substantially uniformly distributed on the base layer 130. Such distribution of the colloid particles 140 may be called a colloidal dimer array.

Larger the volume of a colloid particle 140, greater the light transmissivity of the colloid particle 140 for light having a long wavelength. Accordingly, to transmit light having wide wavelength ranges, the colloid particles 140 having varying volumes are distributed on the base layer 130. The colloid particles 140 are formed to have widths equal to or less than about 100 μm, and more particularly, between about 10 nm and 100 μm As explained above, the use of the antireflection layer having an uneven surface or the colloidal particles increases the transmissivity of the emitted light from the light guide panel or a light source.

Figure 3:
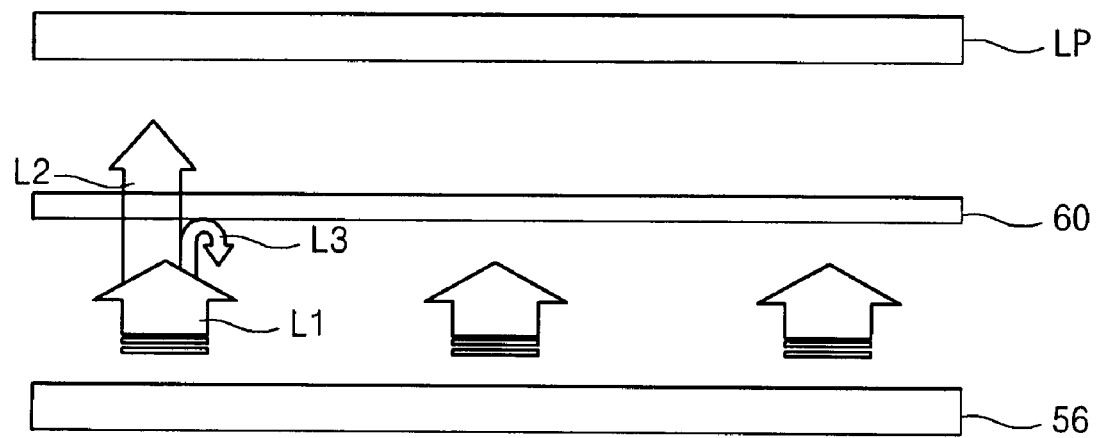
FIG. 3 is a view illustrating a light transmissivity of a backlight unit according to the related art.
Figure 7:
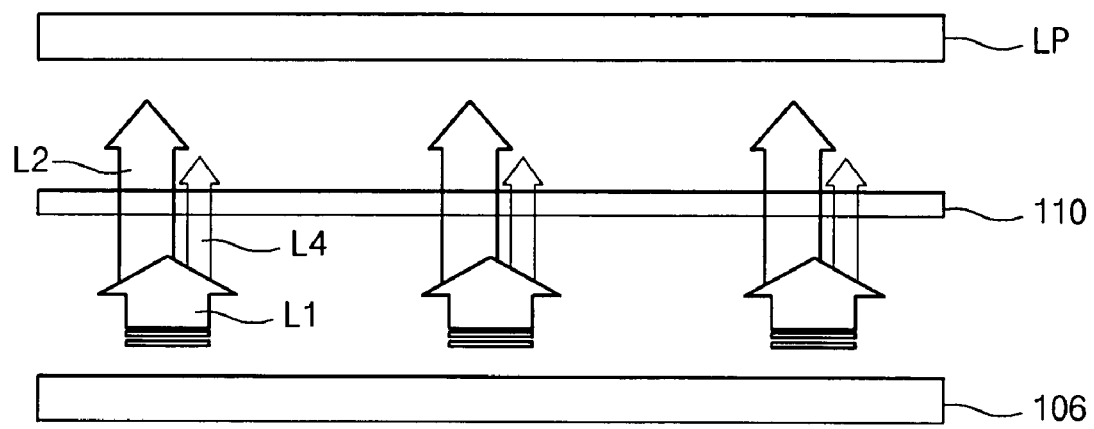
FIG. 7 is a view illustrating a light transmissivity of a backlight unit according to embodiments of the present invention.

FIG. 7 is a view illustrating the transmissivity of a backlight unit according to embodiments of the present invention in relation to that of a backlight unit according to the related art. As shown in FIG. 7, if first light L1 emitted from a light guide panel 106 has about a 100% luminance, then the light passing through the related art optical sheets 60 (in FIG. 3) is second light L2 having about a 60 to 70% luminance. However, passing through the layer combination 110, having the optical sheets 111, 112a, 113b, and 113, and antireflection layers 115a to 115d in the first exemplary embodiment, are second and fourth lights L2 and L4 collectively having a luminance about equal to that of the first light L1. Accordingly, most of the light emitted from the light guide panel 106 is incident on the liquid crystal panel LP.

As explained above, the backlight unit of the present invention uses an antireflection layer or layers to emit a high luminance light. Therefore, the amount of light lost by or in the backlight unit can be reduced, thereby increasing the luminance of displayed images. Furthermore, power consumption and production costs can be reduced.

Figure 8:
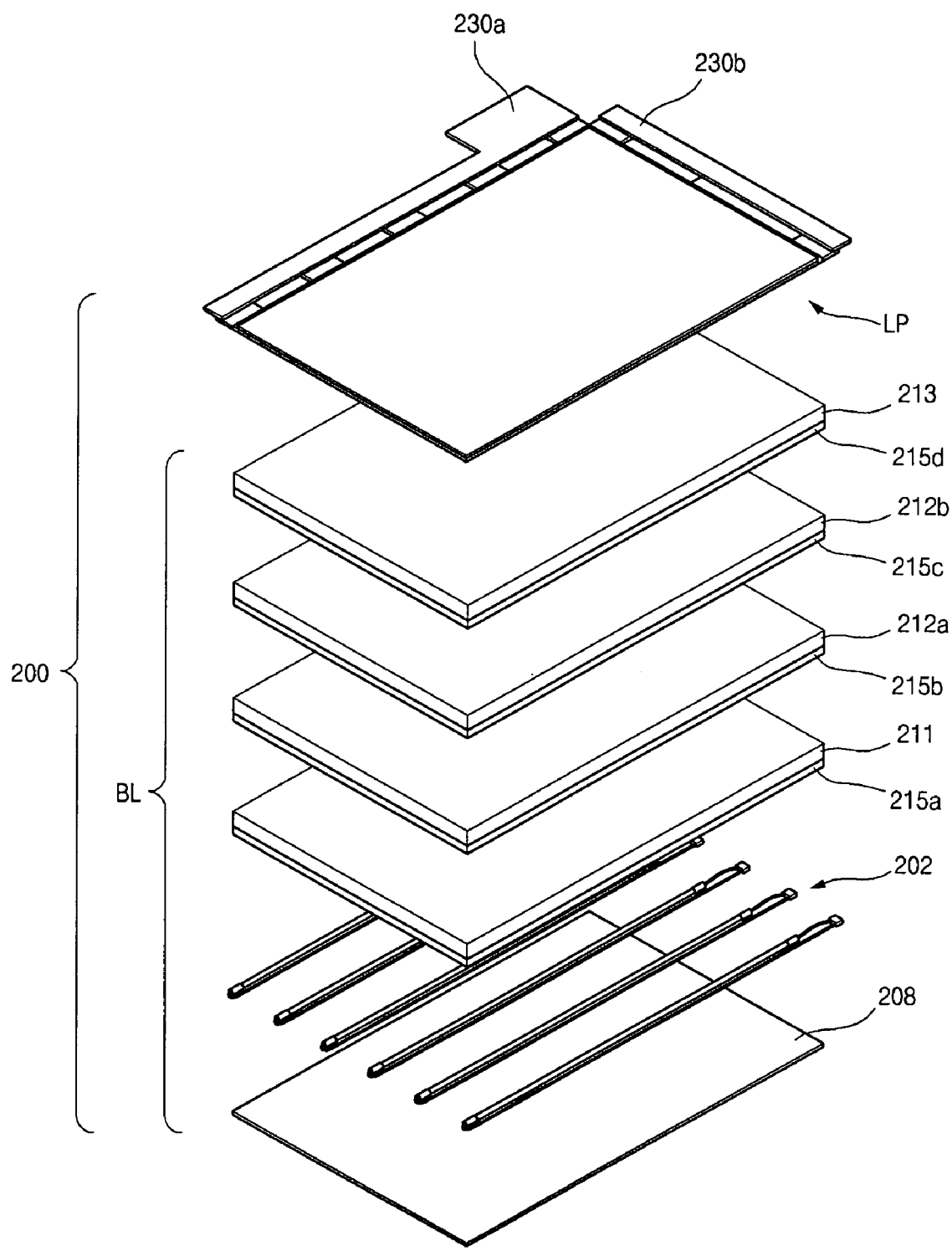
FIG. 8 is a view of an LCD device having a direct type backlight unit according to a second embodiment of the present invention.

FIG. 8 is a view of an LCD device having a direct type backlight unit according to a second embodiment of the present invention. Explanations of parts of this embodiment similar to the parts of the first embodiment are omitted. The backlight unit of the second embodiment is similar to the backlight unit of the first embodiment, except for the lamp arrangement.

Figure 1:
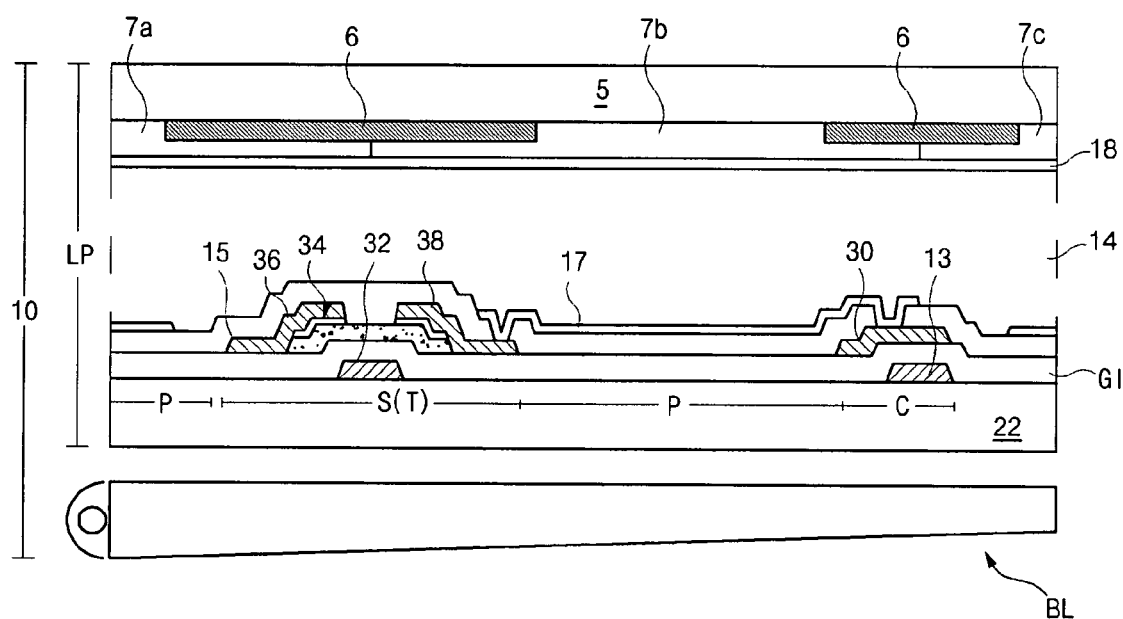
FIG. 1 is a cross-sectional view of an LCD device including a backlight unit according to the related art.
Figure 2:
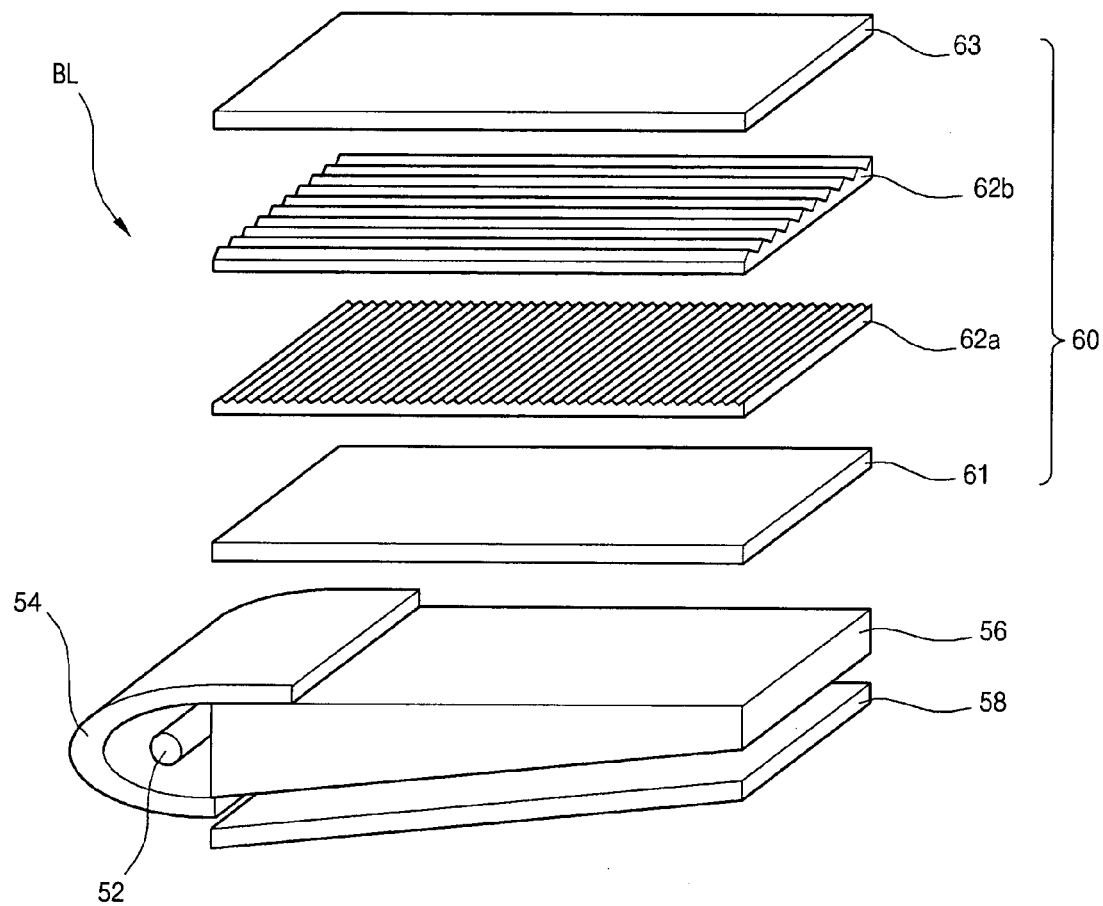
FIG. 2 is a view of an edge type backlight unit of an LCD device according to the related art.

As shown in FIG. 8, an LCD device 200 includes a liquid crystal panel LP, source and gate driving circuit boards 230a and 230b, and a backlight unit BL. The liquid crystal panel LP includes first and second substrates, and a liquid crystal layer, as shown in FIG. 1. The source and gate driving circuit boards 230a and 230b are disposed at side portions of the liquid crystal panel LP.

The backlight unit BL is disposed below the liquid crystal panel LP and supplies light to the liquid crystal panel LP. The backlight unit BL includes a reflector 208, a plurality of lamps 202, a plurality of optical sheets 211, 212a, 213b, and 213, and a plurality of antireflection layers 215a to 215d.

As shown in FIG. 8, in the direct type backlight unit BL, the plurality of lamps 202 are disposed underneath the liquid crystal panel LP, contrary to the edge type backlight unit of the first embodiment. The lamps 202 are arranged in parallel along one direction. In the second embodiment, since the lamps 202 are disposed below the liquid crystal panel LP, a light guide panel 106 (FIG. 4) of the first embodiment may be omitted. Though not shown in FIG. 8, at both end portions of the lamp 202 may be disposed on lamp guides fixing the arrangement of the lamps 202.

The optical sheets in the second embodiment include a diffusion sheet 211, first and second prism sheets 212a and 213b, and a protection sheet 213 disposed sequentially on the lamps 202. The first to fourth antireflection layers 215a to 215d are disposed on the bottom surfaces of the diffusion sheet 211, the first and second prism sheets 212a and 212b, and the protection sheet 213, respectively. Each of the first to fourth antireflection layers 215a to 215d has an uneven surface or colloid particles, as explained with respect to the first embodiment.

In the present invention, the backlight unit uses the antireflection layer to increase a luminance of the light emitted from the backlight unit. Such backlight unit may be applied to display devices, other than LCD devices, that display images using a backlight unit. Also, the antireflection layer layers can be disposed on the top surfaces or on both the top and bottom surfaces of the optical sheets.

It will be apparent to those skilled in the art that various modifications and variations can be made in the LCD device and the backlight unit for the LCD or other display device of the present invention without departing from the spirit or scope of the invention. Thus, it is intended that the present invention cover the modifications and variations of this invention provided they come within the scope of the appended claims and their equivalents.

What is claimed is:

1. A backlight unit for a display device, comprising:
a first optical sheet;
a light source to supply light to the first optical sheet;
a first antireflection layer on a surface of the first optical sheet, wherein the first antireflection layer includes colloid particles distributed on a surface of the first antireflection layer;
second, third and fourth optical sheets, wherein the four optical sheets are a diffusion sheet, first and second prism sheets, and a protection sheet; and
at least one second antireflection layer, the at least one second antireflection layer being disposed on surfaces of the second to fourth optical sheets, wherein the at least one second antireflection layer includes colloid particles distributed on a surface of the at least one second antireflection layer.

2. The backlight unit according to claim 1, wherein the first antireflection layer is on a bottom surface of the first optical sheet.

3. The backlight unit according to claim 1, wherein the first antireflection layer is on a top surface of the first optical sheet.

4. The backlight unit according to claim 1, further comprising a first bottom antireflection layer on a bottom surface of the first optical sheet.

5. The backlight unit according to claim 1, wherein the colloid particles include polystylene.

6. The backlight unit according to claim 1, wherein the colloid particles distributed on the surface of the at least one second antireflection layer include polystylene.

7. The backlight unit according to claim 1, further comprising a light guide panel on a bottom surface of the first optical sheet, wherein the light source is disposed at one side of the light guide panel.

8. The backlight unit according to claim 7, further comprising a reflector on a bottom surface of the light guide panel.

9. The backlight unit according to claim 1, wherein the light source is disposed directly underneath a bottom surface of the first optical sheet.

10. The backlight unit according to claim 9, wherein the light source includes a plurality of lamps arranged in parallel.

11. The backlight unit according to claim 10, further comprising a reflector directly underneath the light source.

12. A backlight unit for a display device, comprising:
a first optical sheet;
a light source to supply light to the first optical sheet;

a first antireflection layer on a surface of the first optical sheet, wherein the first antireflection layer includes colloid particles distributed on a surface of the first antireflection layer;

second, third and fourth optical sheets, wherein the four optical sheets are a diffusion sheet, first and second prism sheets, and a protection sheet; and at least one second antireflection layer, the at least one second antireflection layer being disposed on surfaces of the second to fourth optical sheets, wherein the at least one second antireflection layer includes an uneven surface, wherein the at least one second antireflection layer includes AZO polymer.

13. A display device, comprising:

a display panel;

a first optical sheet on a bottom surface of the display panel;

a light source to supply light to the first optical sheet;

a first antireflection layer on a surface of the first optical sheet, wherein the first antireflection layer includes colloid particles distributed on a surface of the first antireflection layer;

second, third and fourth optical sheets, wherein the four optical sheets are a diffusion sheet, first and second prism sheets, and a protection sheet; and at least one second antireflection layer, the at least one second antireflection layer being disposed on surfaces of the second to fourth optical sheets.

14. The display device according to claim 13, wherein the first antireflection layer is on a bottom surface of the first optical sheet.

15. The display device according to claim 13, wherein the first antireflection layer is on a top surface of the first optical sheet.

16. The display device according to claim 13, further comprising a first bottom antireflection layer on a bottom surface of the first optical sheet.

17. The display device according to claim 13, wherein the colloid particles include polystylene.

18. The display device according to claim 13, wherein the at least one second antireflection layer includes an uneven surface.

19. The display device according to claim 18, wherein the at least one second antireflection layer includes AZO polymer.

20. The display device according to claim 13, wherein the at least one second antireflection layer includes colloid particles distributed on a surface of the at least one second antireflection layer.

21. The display device according to claim 20, wherein the colloid particles distributed on the surface of the at least one second antireflection layer include polystylene.

22. The display device according to claim 13, further comprising a light guide panel on a bottom surface of the first optical sheet, wherein the light source is disposed at one side of the light guide panel.

23. The display device according to claim 22, further comprising a reflector on a bottom surface of the light guide panel.

24. The display device according to claim 13, wherein the light source is disposed directly underneath a bottom surface of the first optical sheet.

25. The display device according to claim 24, wherein the light source includes a plurality of lamps arranged in parallel.

26. The display device according to claim 25, further comprising a reflector directly underneath the light source.

27. The display device according to claim 13, wherein the display panel is a flat panel.

28. The display device according to claim 27, wherein the display panel is a liquid crystal panel.

\* \* \* \* \*